Figure 1:
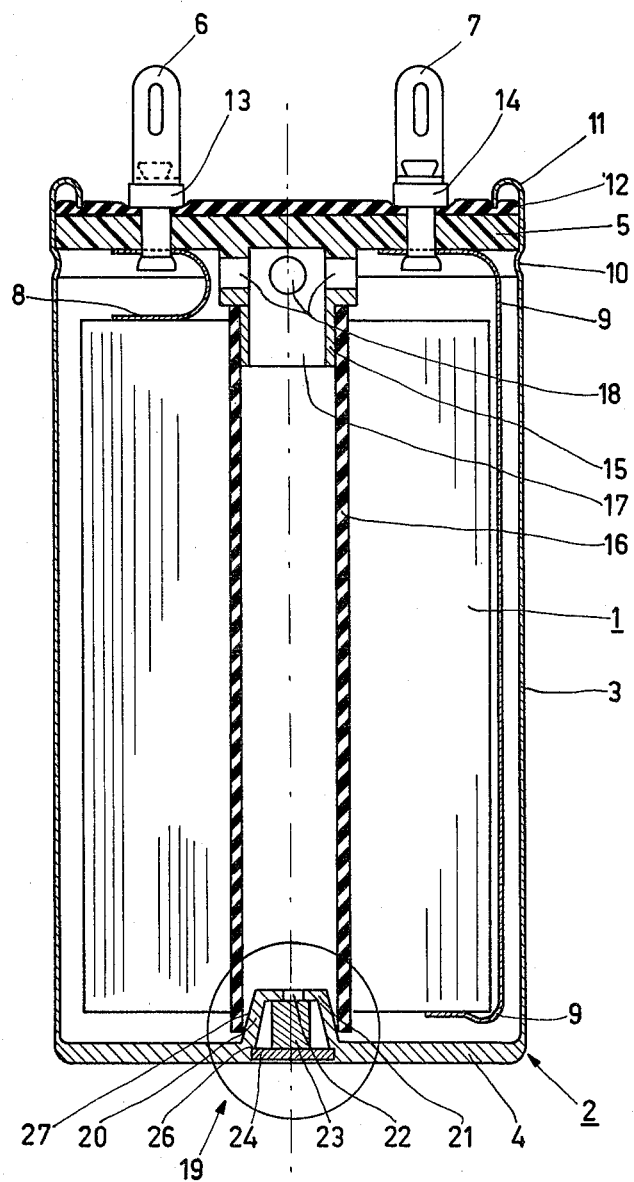

United States Patent [19]

van Gils et al.

[11] 4,245,277
[45] Jan. 13, 1981

[54] ELECTROLYTIC CAPACITOR PROVIDED WITH A PRESSURE RELIEF VALVE

[75] Inventors: Cornelis L. M. van Gils; Marius H. van der Dussen; Pieter Kemkers, all of Eindhoven, Netherlands

[73] Assignee: U.S. Philips Corporation, New York, N.Y.

[21] Appl. No.: 951,225

[22] Filed: Oct. 13, 1978

[30] Foreign Application Priority Data

Nov. 16, 1977 [NL] Netherlands ............... 7712605

[51] Int. Cl.³ .................... H01G 9/00; B01J 17/00
[52] U.S. Cl. ................................ 361/433; 29/570
[58] Field of Search ............... 367/433, 271–275; 29/570

[56] References Cited

U.S. PATENT DOCUMENTS

| | | | |
|---|---|---|---|
| 2,178,686 | 11/1939 | Georgiev et al. | 361/433 |
| 2,227,319 | 12/1940 | Pontis et al. | 361/433 |
| 3,280,381 | 10/1966 | Ayer | 361/433 |
| 3,463,969 | 8/1969 | Wershey | 361/433 |
| 3,904,939 | 9/1975 | Carino | 361/433 |
| 4,007,405 | 2/1977 | Maijers et al. | 361/433 |

FOREIGN PATENT DOCUMENTS

| | | | |
|---|---|---|---|
| 1029935 | 5/1958 | Fed. Rep. of Germany | 361/433 |
| 2517788 | 4/1976 | Fed. Rep. of Germany | 361/433 |
| 567704 | 10/1957 | Italy | 361/433 |

*Primary Examiner*—Andrew J. James
*Attorney, Agent, or Firm*—Thomas A. Briody; Robert T. Mayer; Paul R. Miller

[57] ABSTRACT

Electrolytic capacitors are provided with a pressure-relief valve which opens if the gas pressure inside the capacitor exceeds a given value to relieve the pressure. In the case of severe electrical overloading, however, the gas-relief passage usually is of insufficient size to prevent excessive pressure build-up, and there is a possibility of explosions. The present invention provides a capacitor in which the pressure-relief valve comprises a venting aperture in a bowl-shaped recess member with the aperture being closed by an elastic member held in compression over the aperture by a thermoplastic strip secured at its ends to the wall of the capacitor housing. The valve is self-sealing for minor pressure increases, but with severe increases a rapid temperature rise of the capacitor roll softens the thermoplastic strip which then allows the elastic member to be blown away so that the aperture becomes directly open to the atmosphere and allows the excessive pressure to be released very rapidly to prevent any possible explosion.

6 Claims, 3 Drawing Figures

ELECTROLYTIC CAPACITOR PROVIDED WITH A PRESSURE RELIEF VALVE

The invention relates to an electrolytic capacitor comprising a housing accommodating a capacitor roll which is provided with electrical connections passed through a lid closing the housing, and also comprising an excess pressure relief valve which is provided with a blow-off aperture situated in the bottom of a bowl-shaped recess facing the lid and which is closed by an elastic member being elastically deformable in reaction to a given excess pressure in the housing, thus establishing an open communication with the surroundings of the capacitor. The invention also relates to a housing for such a capacitor.

U.S. Pat. No. 3,463,969 describes a capacitor of the kind set forth in which the blow-off aperture of the excess pressure relief valve is closed by a spike-shaped elastic plug which extends inside the capacitor housing. When this known capacitor is slightly overloaded in an electrical circuit, a small temperature rise and development of gas will occur in the capacitor roll. As a result, the gas pressure in the capacitor housing becomes so high in the course of time that the force exerted by the gas on the side of the elastic plug becomes higher than the closing force of the elastic plug, so that the latter is laterally compressed into open communication with the surroundings. For the duration of the slight overloading, a sufficient amount of gas can then be blown off to prevent a further pressure increase. After termination of the overloading and the associated development of gas, the blow-off aperture is automatically closed again. In the case of substantial overloading, for example, caused by an incorrect electrical wiring connection during fitting, substantial development of gas occurs, notably due to the very fast and extensive evaporation of the electrolyte. The plug will then be blown out of the aperture, so that gas pressure is no longer required for sustaining the opening, exploding of the housing thus being prevented.

The known capacitor has a drawback in that the spike-shaped elastic plug extends inside the capacitor housing. If the pressure inside the capacitor housing increases due to slight overloading, it is desirable for the excess pressure relief valve to open when the excess pressure exceeds a value to be determined and adjusted in advance. This desired operation of the excess pressure relief valve not only depends on the elastic properties of the plug, but also greatly on the dimensional tolerances of the outer diameter of the plug and of the inner diameter of the blow-off aperture of the excess pressure relief valve. In order to realize an acceptable cost price in the bulk manufacture of the capacitor, the tolerances, however, should be so large that the desired operation, and hence a reliable and adequate protection, is not ensured for all capacitors. The interaction between the material of the part of the plug which extends inside the capacitor housing and the electrolyte liquid or vapour which definitely occurs after slight overloading, will affect the elastic properties of the plug in the course of time. This change of the elastic properties has an adverse effect on the explosion safety of the capacitor, as life tests with various elastic materials have demonstrated. In many cases, the plug hardens under the influence of such interaction, so that the capacitor housing explodes before the plug is forced out of the blow-off aperture.

The present invention has for its object to provide an electrolyte capacitor in which these drawbacks are at least mitigated. According to one aspect of the invention, there is provided an electrolytic capacitor of the kind described above, characterized in that the blow-off aperture in the bottom of the bowl-shaped recess is closed by the elastic member which is mechanically biased against the bottom of the bowl-shaped recess by a softenable thermoplastic strip being secured by deformation of the wall of the housing in the vicinity of the edge of the bowl-shaped recess.

The excess pressure relief valve, which can be simply and comparatively cheaply manufactured in bulk, has a comparatively small diameter and extension inside the capacitor housing and can, therefore, also be used for supporting and centering the capacitor roll. Optimum use is then made of the space inside the capacitor housing for the production of capacitance.

The capacitor in accordance with the invention is also explosion-proof because the strip whereby the elastic member is mechanically biased is made of a softenable thermoplastic material. In the case of major overloading of the capacitor, the temperature thereof increases to such an extent that the strip softens with the result that the elastic member is blown out of the bowl-shaped recess by excess pressure in the housing. The gas developed in the case of major overloading can then escape through the blow-off aperture which is now in direct open communication with the surroundings. No further gas pressure is required for maintaining this direct open connection. The risk of explosion has at least been reduced. When a suitable thermoplastic material is chosen, it is ensured that, in the case of major overloading, the thermoplastic strip softens before the pressure inside the capacitor has become inadmissibly high, so that the capacitor is explosion-proof.

In accordance with another aspect of the invention, there is provided a capacitor housing provided with a blow-off aperture which is provided in the bottom of a bowl-shaped recess formed in a wall of the housing and which is closed by an elastic member biased against the aperture surround by a thermoplastic strip secured at its ends to the wall of the housing.

The elastic member does not extend inside the capacitor housing, but only covers the blow-off aperture in the bowl-shaped recess. The desired operation of the excess pressure relief valve is thus determined by the elastic properties of the member and by the degree of biasing thereof, but not by the dimensional tolerances of the diameter of the member and the blow-off aperture. The valve, and hence the capacitor, can thus be comparatively simply and inexpensively manufactured in bulk. Life tests have also demonstrated that the explosion protection still functions adequately after prolonged use of the capacitor. This is because the operation of the explosion protection is determined by the thermoplastic properties of the thermoplastic biasing strip. This strip does not at all come into contact with electrolyte liquid or electrolyte vapour, or only slightly so, during operation of the capacitor, so that the thermoplastic properties thereof cannot at all or only slightly be affected thereby.

Figure 2:
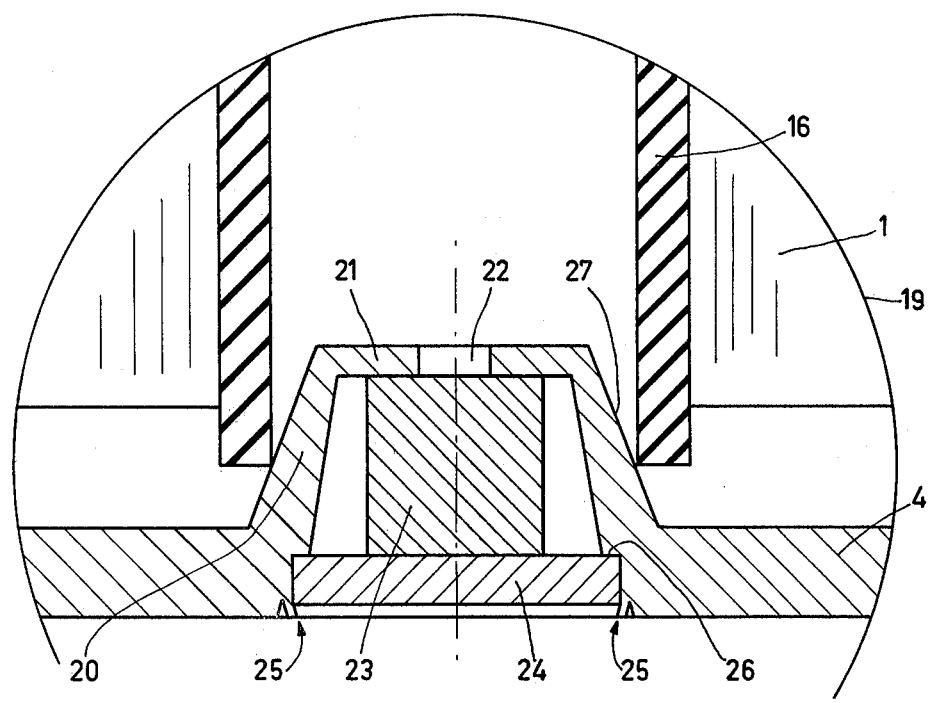
Figure 3:
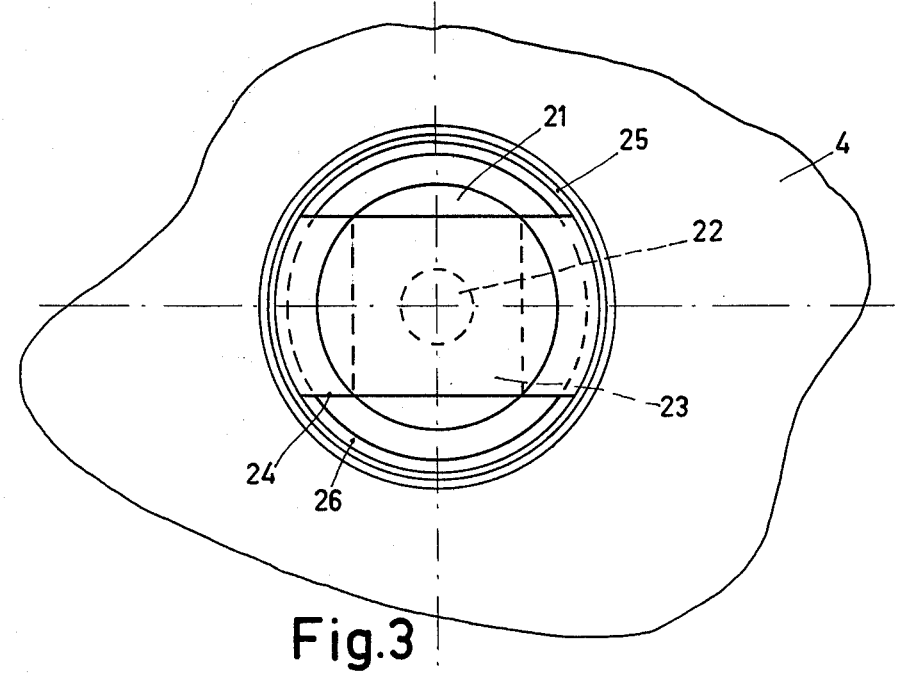

An embodiment of the invention will now be described in detail, by way of example, with reference to the accompanying diagrammatic drawing, of which:

FIG. 1 is a longitudinal sectional view of an embodiment of an electrolytic capacitor in accordance with the invention, FIG. 2 shows the encircled part of the sectional view of FIG. 1 on an increased scale, and FIG. 3 is an end elevation of the part of the electrolytic capacitor shown in a sectional view in FIG. 2.

FIG. 1 shows an electrolytic capacitor, comprising a capacitor roll 1 which is accommodated in an aluminium housing 2 which comprises a cylindrical wall 3 and a bottom 4 which is integral with the wall 3. The housing 2 is closed on the upper side by a lid 5 of rigid plastics material provided with connection terminals 6 and 7 electrically connected by way of connection strips 8 and 9, respectively, to the electrodes (not shown) in the capacitor roll 1. The lid 5, secured in the housing 2 by means of a circumferential ridge 10 and a turned-over top edge 11, is provided with a resilient layer 12 which is elastically deformed during the manufacture of the capacitor by the top edge 11 and by the shoulders 13 and 14 of the connection terminals 6 and 7, respectively, so that gastight sealing of the housing 2 is achieved. The lid 5 comprises a centering member 15 whereby the capacitor wrap 1 is supported and centered in the housing 2 by a hollow core 16 of electrically-insulating material situated inside the roll. The centering member 15 is provided with a bore 17 and apertures 18 where the space between the capacitor wrap 1 and the housing 2 communicates with the space inside the hollow core 16 of the capacitor roll 1.

The housing 2 is provided with an excess-pressure relief valve 19 which is flush-mounted in the bottom 4. The excess-pressure relief valve 19, shown in a sectional view on an increased scale in FIG. 2 and in an elevational view in FIG. 3, comprises a bowl-shaped recess member 20, having the shape of a truncated cone, integral with the bottom 4, the bottom portion 21 of the recess facing the lid 5. In the bottom portion 21 there is provided a blow-off aperture 22 which is closed by an elastic plug 23 and mechanically compressed by a strip 24 of thermoplastic material. The strip 24 is secured on a seat 26 of the recess member 20 by way of a punched-in edge 25. The elastic plug 23, being made of, for example, neoprene having a rubber hardness of between 50° Sh and 100° Sh, is so compressed that if the pressure in the electrolytic capacitor increases to approximately 2 atmosphere gauge pressure then elastic compression of plug 23 takes place such that an open communication is established with the surroundings of the electrolytic capacitor and the excess pressure is relieved. A small development of gas occuring by a minor overloading of the electrolytic capacitor in an electric circuit due to evaporation of electrolyte may cause the internal pressure to reach, but not greatly exceed two atmospheres. The gas is then blown-off due to compression of plug 23 and the internal pressure is thus reduced. After termination of such minor overloading and associated development of gas, the blow-off aperture 22 is again closed. Therefore, in the case of minor overloading the electrolytic capacitor will certainly not explode or otherwise being damaged beyond repair. Major overloading of the electrolytic capacitor, caused for example by incorrect electrical wiring connection, causes very severe development of gas and possibly even total evaporation of the electrolyte. Because on the one hand the valve may only have limited dimensions and on the other hand the maximum possible compression of the elastic plug under this circumstance limits the possible enlargement of the open connection, the dimensions of the blow-off aperture may be inadequate to relieve the internal pressure in the case of severe overloading in which case the pressure in the capacitor could become inadmissibly high if no further steps were taken. This possible drawback is eliminated by the use of a strip 24 of thermoplastic material which, for example, softens at approximately 140° C. Preferably, polypropylene reinforced with 40% fiberglass is used as the thermoplastic material. The fiberglass reinforcement counteracts creepage in the strip 24. It will be obvious that, depending on the anticipated pressures and temperatures, different kinds of thermoplastic materials can be used in different kinds of electrolytic capacitors. In the case of severe overloading of the electrolytic capacitor, the temperature thereof increases so greatly that such a thermoplastic strip softens, so that the plug 23 can be blown out of the recess 22 and the blow-off aperture 20 comes into direct open communication with the surroundings of the capacitor. The gas developed in the case of severe overloading can subsequently escape without a high pressure being required for maintaining the open communication with the surroundings. The risk of explosion of the capacitor due to this pressure is thus eliminated, because in the case of severe overloading of the electrolytic capacitor the thermoplastic strip 24 softens well before the pressure inside the capacitor becomes so high that the risk of explosion arises.

The elastic plug 23 is preferably formed by a rectangular block of square cross-section whose circumscribed circle in the plane of contact with the bottom 21 of the recess member 20 has a diameter which is substantially equal to the smallest inner diameter of the conical recess member 20. Simple and reliable (self-seating) mounting of the elastic plug 23 in the recess member 20 and proper closing of the blow-off aperture 22 are thus ensured. As a result of the square cross-section of the elastic plug 23, so much space is present between this plug and the wall of the recess 20, even if the latter has a cylindrical instead of a frostoconical shape, that adequate open communication with the surroundings is ensured when the elastic plug 23 is elastically deformed by excess pressure inside the capacitor.

Inside the capacitor housing, the recess member 20 comprises a part conical surface 27 whereby the capacitor roll 1 is supported and centered by way of the hollow core 16. A very rigid arrangement of the capacitor wrap inside the capacitor is thus achieved.

What is claimed is:

1. An electrolytic capacitor comprising:
    a housing accommodating a capacitor roll having electrical connections passing through a lid of said housing; and
    an excess pressure relief valve including
        (a) a bowl-shaped recess member having a blow-off aperture at a portion facing said lid,
        (b) an elastic member closing said blow-off aperture, said elastic member being elastically deformable according to a predetermined excess pressure to form an open communication to surroundings of said housing, and
        (c) a softenable thermoplastic strip mechanically biasing said elastic member against said bowl-shaped recess member to close said blow-off aperture; said thermoplastic strip being secured by deformation of said housing wall in the vicinity of the edge of said bowl-shaped recess member.

2. A capacitor according to claim 1, wherein said thermoplastic strip consists of fiberglass reinforced polypropylene.

3. A capacitor according to claims 1 or 2, wherein said bowl-shaped recess member has a wall for seating said thermoplastic strip, said thermoplastic strip being secured on said seat by a punched-in edge of said bowl-shaped recess member.

4. A capacitor according to claim 1, wherein said bowl-shaped recess member has round sections, and said elastic member is a rectangular block having a flat side bearing against a bottom surface of said bowl-shaped recess member said elastic member having a circumscribed circle with a diameter substantially equal to the inner diameter of said bowl-shaped recess member of the plane of contact.

5. A capacitor according to claim 1, wherein said bowl-shaped recess member is shaped as a truncated cone on which said capacitor roll bears by an inner edge of a tubular core of said roll.

6. A capacitor housing comprising a bowl-shaped recess member having a blow-off aperture provided in a wall of said housing, an elastic member closing said aperture, and a thermoplastic strip secured to said wall of said housing for biasing said elastic member against the aperture surround.

\* \* \* \* \*